(12) United States Patent
Warren

(10) Patent No.: US 12,018,187 B2
(45) Date of Patent: Jun. 25, 2024

(54) DECORATIVE RIBBON WITH PROTECTIVE ADHESIVE BACKING

(71) Applicant: Patrice Warren, Granger, IN (US)

(72) Inventor: Patrice Warren, Granger, IN (US)

( * ) Notice: Subject to any disclaimer, the term of this patent is extended or adjusted under 35 U.S.C. 154(b) by 0 days.

(21) Appl. No.: 17/747,028

(22) Filed: May 18, 2022

(65) Prior Publication Data

US 2023/0332019 A1 Oct. 19, 2023

Related U.S. Application Data

(60) Provisional application No. 63/330,943, filed on Apr. 14, 2022.

(51) Int. Cl.
| | | |
|---|---|---|
| C09J 7/21 | (2018.01) | |
| B32B 5/02 | (2006.01) | |
| B32B 5/26 | (2006.01) | |

(52) U.S. Cl.
CPC ........ *C09J 7/21* (2018.01); *B32B 5/02* (2013.01); *B32B 5/024* (2013.01); *B32B 5/26* (2013.01); *B32B 2250/02* (2013.01); *B32B 2250/20* (2013.01); *B32B 2250/44* (2013.01); *B32B 2262/02* (2013.01); *B32B 2262/062* (2013.01); *B32B 2262/08* (2013.01); *B32B 2262/101* (2013.01); *B32B 2405/00* (2013.01); *B32B 2451/00* (2013.01)

(58) Field of Classification Search
CPC ... C09J 7/21; B32B 5/02; B32B 5/024; B32B 5/26; B32B 2250/02; B32B 2250/20; B32B 2250/44; B32B 2262/02; B32B 2262/062; B32B 2262/08; B32B 2262/101; B32B 2405/00; B32B 2451/00; Y10T 428/14
See application file for complete search history.

(56) References Cited

U.S. PATENT DOCUMENTS

| | | | | |
|---|---|---|---|---|
| 2,349,710 A | * | 5/1944 | Evans | ................ A61F 13/0273 428/196 |
| 2,531,631 A | * | 11/1950 | Jordan | ...................... G09F 3/10 428/343 |
| 2,904,917 A | * | 9/1959 | Sidorov | ..................... C09J 7/21 428/104 |

(Continued)

FOREIGN PATENT DOCUMENTS

| | | | | |
|---|---|---|---|---|
| GB | 893807 A | * | 4/1962 | |
| WO | WO-0072055 A1 | * | 11/2000 | ................ C09J 7/29 |

*Primary Examiner* — Patricia L. Nordmeyer
(74) *Attorney, Agent, or Firm* — Brennan, Manna & Diamond, LLC

(57) ABSTRACT

The present invention relates to a decorative ribbon made of natural or synthetic fiber with an integrated adhesive backing. The ribbon is in the form of a roll from which a length of the ribbon can be pulled and cut for use. The ribbon has a decorative surface and an opposite adhesive surface wherein the adhesive surface is protected by a cover. The cover is peeled off to access the adhesive surface and the ribbon is placed on an object material surface, such as a fabric, with the adhesive surface facing the fabric. The adhesive layer maintains straight and accurate placement of the ribbon without any wrinkles, buckling, or puckering. The ribbon comes in a variety of colors, designs, and sizes and obviates the requirement of a user to hold the ribbon against the object material using needles or glue, et al.

13 Claims, 5 Drawing Sheets

(56) References Cited

U.S. PATENT DOCUMENTS

| | | | | |
|---|---|---|---|---|
| 4,826,712 A | * | 5/1989 | Theno | C09J 7/22 |
| | | | | 428/352 |
| 5,244,701 A | * | 9/1993 | Saigo | C09J 7/38 |
| | | | | 442/151 |
| 5,635,001 A | * | 6/1997 | Mahn, Jr. | B32B 27/12 |
| | | | | 156/290 |
| 5,691,023 A | * | 11/1997 | Keller | B44C 1/105 |
| | | | | 229/87.01 |
| 6,080,459 A | * | 6/2000 | Keller | B44C 1/105 |
| | | | | 223/46 |

* cited by examiner

DECORATIVE RIBBON WITH PROTECTIVE ADHESIVE BACKING

CROSS-REFERENCE TO RELATED APPLICATION

The present application claims priority to, and the benefit of, U.S. Provisional Application No. 63/330,943, which was filed on Apr. 14, 2022 and is incorporated herein by reference in its entirety.

FIELD OF THE INVENTION

The present invention relates generally to the field of decorative ribbons. More specifically, the present invention relates to a silk or satin ribbon that has an integrated adhesive layer for applying to any desired surface for maintaining straight and accurate placement without worry of the ribbon sliding out of place. The ribbon has a decorative front surface/layer, and the adhesive is integrated on the rear of the ribbon. The ribbon is available in the form of a roll with the ribbon rolled on a spool and can be cut to a desired size or length as per requirement of a user. The ribbon is ironed on any object material surface with the adhesive layer contacting the object material surface for adhering to the object material surface. Accordingly, the present disclosure makes specific reference thereto. Nonetheless, it is to be appreciated that aspects of the present invention are also equally applicable to other like applications, devices, and methods of manufacture.

BACKGROUND

By way of background, ribbons are widely used by individuals for application on clothing, arts, crafts, and more (i.e., object material surfaces). Ribbons are generally used for decorating and enhancing looks and are stitched to a fabric, clothing, and more. Ribbon embroidery is a common embellishment technique that employs silk ribbons stitched for creating flowers and decorative stitches for quilts, accessories, crafts, garments, and more. Satin ribbons are used for craft projects and are generally used for making geometric or abstract patterns, wrapping gifts, decorating, and more. However, applying a ribbon to clothing, arts, crafts, etc. is a difficult process.

Individuals use fabric glues like glue for stretchy fabrics, washable glue, hot glue, iron-activated glue and more for adhering the ribbon. Glue is applied using a glue runner, glue stick and more. However, glue often shifts between the ribbons and between the ribbon and the adhering surface, causing misplacement of the ribbon, wrinkles in ribbon and may also damage the fabric. Ribbons when applied and stitched into a fabric without glue, pucker up the fabric causing damage to the fabric. Individuals desire an improved ribbon that can easily and safely adhere to any fabric, art, craft and more to overcome the problems with use of conventional glues.

Many individuals use a see-through quilting ruler for precise positioning of ribbons. However, when a ribbon is sewn, the ribbon tends to shift from the position and may force a user to remove stitches due to the ribbon not being secured in place. For prohibiting shifting of ribbons during stitching, use of pins or needles is common to keep ribbons static, however, pins and needles may damage the fabric or craft with unnecessary holes therein and as a result, individuals desire improved ways of retaining the ribbons in place without any shifting during stitching and sewing.

During use of ribbons, individuals require a plurality of ribbons of various sizes and lengths. Conventional ribbons are difficult to cut and slice and as a result, users may not get a desired size and the ribbons may get damaged. Individuals desire ribbons that are easy to cut enabling individuals to cut sizes or lengths for desired applications.

Therefore, there exists a long-felt need in the art for improved ribbons that can be easily applied to any object material surface. There is also a long-felt need in the art for a silk and/or satin ribbon that maintains straight and accurate placement without worry of sliding out of place. Additionally, there is a long-felt need in the art for ribbons that are easy to cut enabling individuals to obtain desired sizes for various applications. Moreover, there is a long-felt need in the art for silk and satin ribbons that obviate use of applying glue on a rear side of the ribbons for precise adhering on an 'object' surface. Further, there is a long-felt need in the art for unique silk and satin ribbons that obviate the use of needles and pins for accurate and straight placement on any object material surface. Furthermore, there is a long-felt need in the art for multipurpose ribbons that are used with clothes, crafts, arts, and any type of embroidery. Finally, there is a long-felt need in the art for unique satin or silk ribbons that are easier to apply and remain in place on any clothing garment, fabric material, art piece, and more.

The subject matter disclosed and claimed herein, in one embodiment thereof, comprises a decorative and adhesive ribbon used for application on clothes, fabrics, art, crafts, and more. The ribbon is configured to be applied to any object material surface and is made of a natural or synthetic fabric. The ribbon further comprising a front decorative layer having a design; a rear adhesive layer; an adhesive disposed on said adhesive layer; an adhesive layer protective backing covering and protecting the adhesive layer from damage, wherein the backing is peeled off for accessing the adhesive layer for use; the ribbon is in the form of a roll on a spool wherein the ribbon is unrolled using a free end of the ribbon and is configured to be cut to a desired length. The ribbon is ironed with the adhesive layer facing or contacting the 'object' surface for maintaining straight and accurate placement of the ribbon without worry of sliding or buckling.

In this manner, the novel ribbon of the present invention accomplishes all of the foregoing objectives and provides users unique satin or silk ribbon featuring an adhesive backing that allows users to apply the ribbon to a desired (i.e., object) surface via the adhesive, maintaining straight and accurate placement without worry of the ribbon sliding out of place or buckling. The ribbon enables users to cut the silk or satin ribbon to size (i.e., length) for desired application and obviates use of any additional glue, needles, and pins.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a decorative and adhesive ribbon. The ribbon is made of a natural or synthetic fabric and further comprises a decorative surface having a design, an adhesive layer, a fabric adhesive disposed on said adhesive layer, an adhesive layer protective backing covering the adhesive layer, wherein the backing is peeled off for accessing the adhesive layer; the ribbon is in the form of a roll on a spool wherein the ribbon is unrolled using a free end of the ribbon and is configured to be cut to a desired length.

In yet another embodiment, the adhesive is one of acrylic-based adhesive, double-sided fabric tape and glass cloth tape.

In yet another embodiment, the adhesive layer is easily removable from the fabric by pulling the ribbon.

In yet another embodiment, the ribbon is made from silk, satin, cotton, or a combination thereof.

In yet another embodiment, the width of the ribbon is from about ¼ inch to about 2 inches.

In yet another embodiment, the adhesive layer is stitched to the ribbon using zigzag stitching or straight stitching.

In yet another embodiment, the decorative surface has a design or an embroidery.

In yet another embodiment, the adhesive layer has a thickness from about 0.25 mm to about 1.25 mm.

In yet another embodiment, the adhesive layer is fabric friendly and biodegradable.

In yet another embodiment, a method for accurately and securely applying a ribbon on a fabric for sewing the ribbon is described. The method includes the steps of providing an adhesive fabric or ribbon, the fabric including an adhesive layer and an opposite decorative layer wherein the adhesive layer is protected by a protective covering; removing the protective covering to access the adhesive layer; ironing the ribbon on the fabric with the adhesive layer facing the fabric enabling the ribbon to be accurately placed and positioned on the fabric without any wrinkles; and, sewing the ribbon at desired positions to the fabric.

In yet another embodiment, an adhesive silk or satin ribbon for use while sewing various items without the ribbon sliding is disclosed. The ribbon can be comprised of a roll of satin or silk ribbon, the rolled ribbon can be cut to a desired size or length. The ribbon has an adhesive layer protected by a backing cover wherein the cover is peeled off to access the adhesive layer for sticking the ribbon on an object material surface with the adhesive side facing the fabric. The adhesive layer allows the ribbon to be accurately placed and positioned without unwanted movement or buckling.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
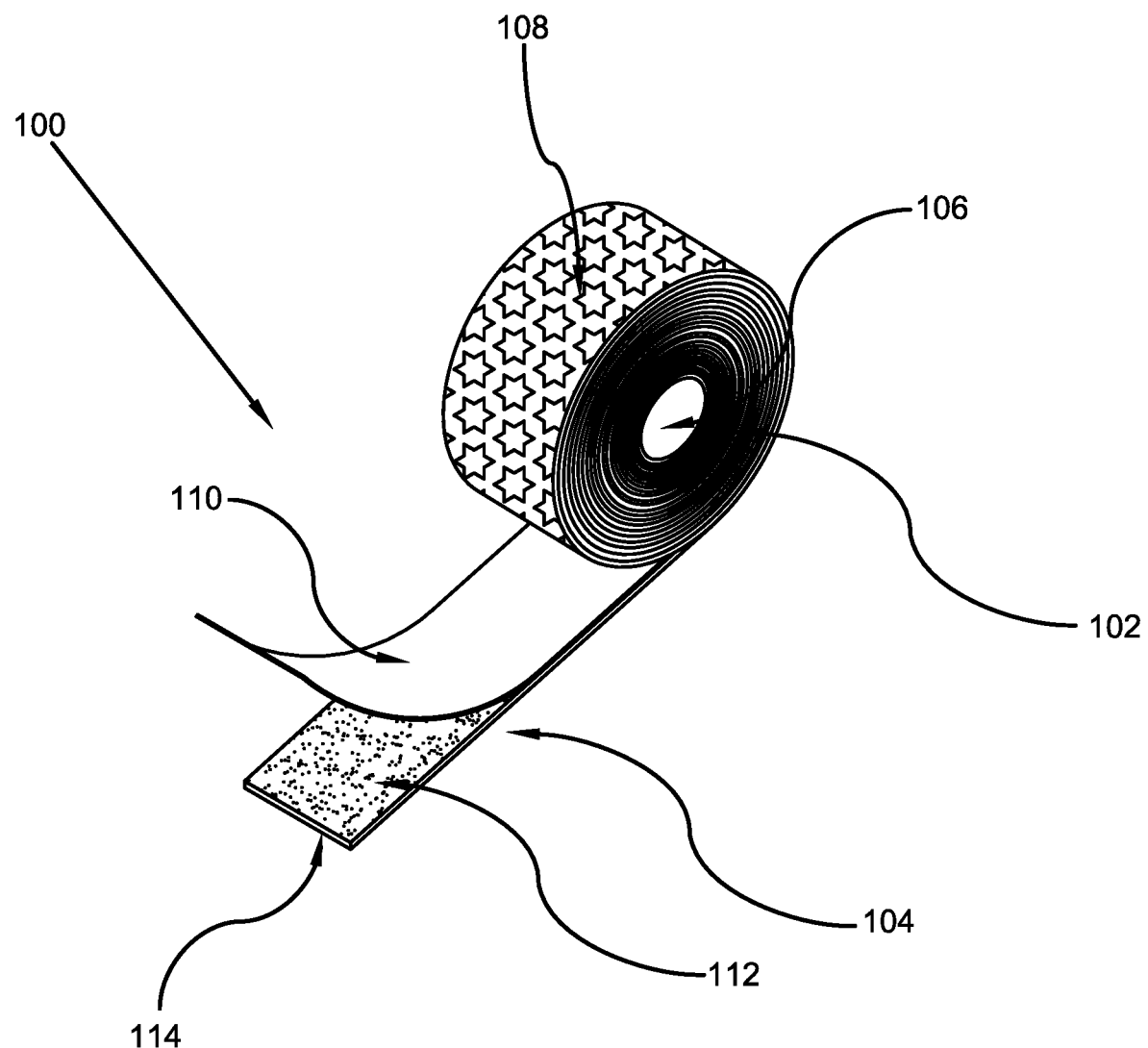
FIG. 1 illustrates a perspective view of one potential embodiment of an adhesive ribbon of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for improved ribbons that can be easily applied to any object material surface. There is also a long-felt need in the art for a silk or satin ribbon that maintains straight, accurate, and secure placement while prohibiting buckling and misplacement of the ribbon on the desired object material surface. Additionally, there is a long-felt need in the art for ribbons that are easy to cut enabling individuals to obtain desired sizes and lengths for various applications. Moreover, there is a long-felt need in the art for silk and satin ribbons that obviate use of applying glue on a rear side of the ribbons for precise adhering on an 'object' surface. Further, there is a long-felt need in the art for unique silk and satin ribbons that obviate use of needles and pins for accurate and straight placement of the ribbons on any object material surface. Furthermore, there is a long-felt need in the art for multi-purpose ribbons that are used with clothes, crafts, arts, and any type of embroidery. Finally, there is a long-felt need in the art for unique satin or silk ribbons that are easier to apply and remain in place on any clothing garment, fabric material, art piece, and more.

The present invention, in one exemplary embodiment, is an adhesive silk or satin ribbon for use while sewing various items without the ribbon sliding. The ribbon is comprised of a roll of satin or silk ribbon, the rolled ribbon can be cut to a desired size or length. The ribbon has an adhesive layer protected by a backing cover wherein the cover is peeled off to access the adhesive layer for sticking the ribbon on an object material surface with the adhesive side facing the fabric. The adhesive layer allows the ribbon to be accurately placed without any sliding.

Referring initially to the drawings, FIG. 1 illustrates a perspective view of one potential embodiment of the adhesive ribbon of the present invention in accordance with the disclosed architecture. The adhesive ribbon 100 of the present embodiment is in the form of a roll 102 of a silk or satin ribbon 104. The silk or satin ribbon 104 is rolled around a spool 106 and includes a decorative front surface/layer 108 and an adhesive protective backing or covering 110. The adhesive protective backing or covering 110 protects the rear adhesive surface/layer 112 of the ribbon 104 and is configured to be peeled off for using the ribbon 104. The ribbon 104 can be pulled from the roll 102 using the free end 114 and is cut easily using a scissor or any pointed object to get a desired length for an application. The rear adhesive surface/layer 112 has an adhesive permanently disposed thereon for adhering to any object material surface.

The decorative front surface 108 and the adhesive surface 112 span generally along the entire length of the ribbon 104 and the ribbon 104 remains intact when cut to a desired length. The rear adhesive surface 112 allows the ribbon 104 to easily adhere to any object material surface, such as, fabric, art, crafts, and more without sliding, shifting, or buckling during placement and prohibits sliding, shifting, and buckling during sewing of the ribbon 104.

The front surface 108 can have any color, design, embroidery, and texture. Further, when the ribbon 104 is placed on any fabric, art and more, the front surface 108 is visually exposed while the rear surface or adhesive layer 112 adheres to an object material surface. The adhesive applied to the rear surface or adhesive layer 112 can be an acrylic-based adhesive, double-sided fabric tape, or glass cloth tape. General purpose glass cloth tape features a pressure sensitive silicone adhesive for applications requiring high-temperature resistance and high adhesion. Glass cloth tape can be used for high temperature applications (i.e., ironing) requiring high tensile strength and good holding power. The adhesive enables the ribbon 104 to be easily removed from a fabric or object material surface before sewing without any damage to the object material surface. Further, the adhesive layer 112 is pressure sensitive and is adhered by ironing the ribbon 104 with the adhesive side 112 facing or contacting the object material surface.

Figure 2:
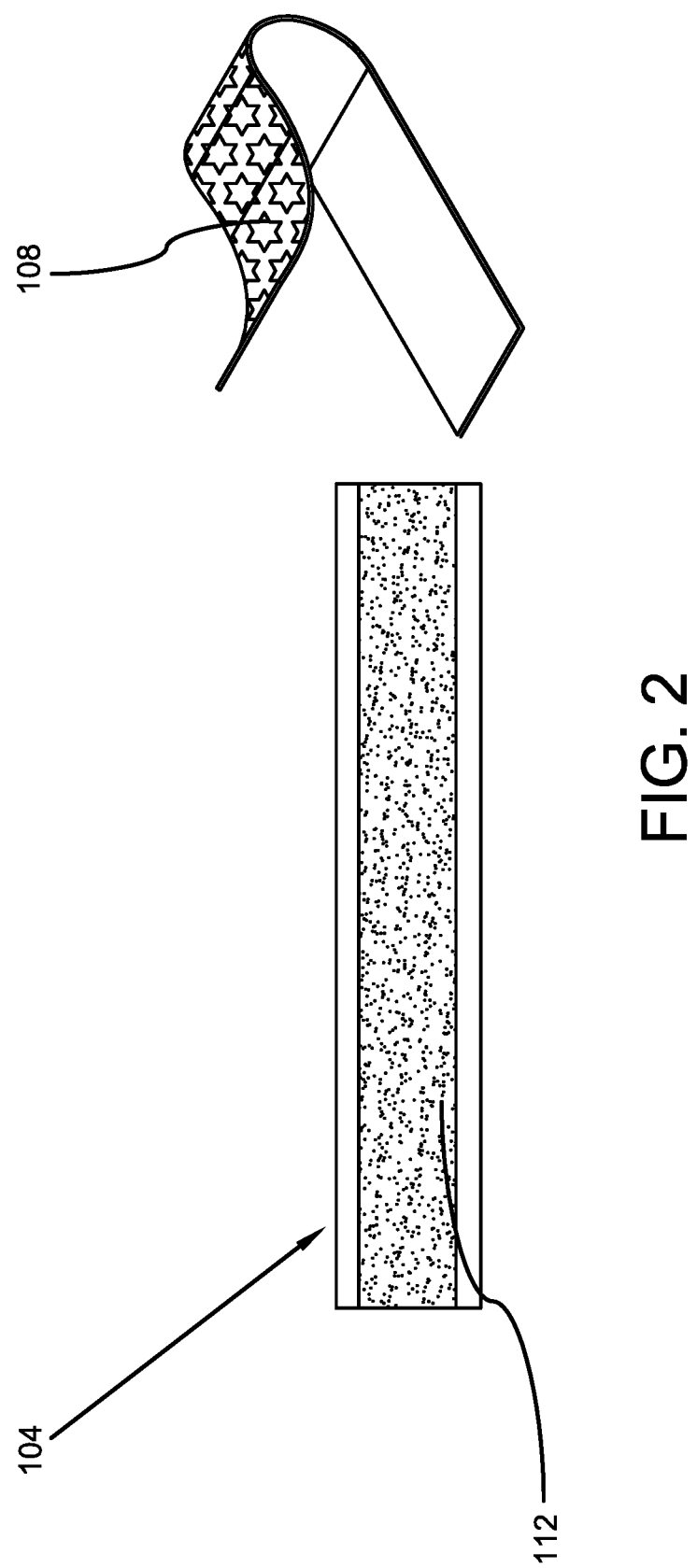
FIG. 2 illustrates an alternate view of the silk or satin ribbon of FIG. 1 in accordance with the disclosed architecture.

FIG. 2 illustrates an alternate view of the silk or satin ribbon 104 of FIG. 1 in accordance with the disclosed architecture. The adhesive is permanently pasted to the ribbon 104 during manufacturing of the ribbon 104. In preferred embodiment, the adhesive is formed as the adhesive layer 112 by heating and pressurizing the adhesive onto the ribbon. The adhesive layer 112 may have a width equaling the width of the ribbon 104. Alternatively, the adhesive layer 112 may have a width from about 70% to about 90% of the width of the ribbon 104.

The ribbon 104 can be made from natural material like silk, satin, or cotton or can alternatively be made from synthetic fibers like taffeta. Preferably, the ribbon 104 is made of approximately 80% natural material and approximately 20% synthetic fiber (a person of ordinary skill in the art will understand that "approximately" used in this context means "within a few percentage points").

Figure 3:
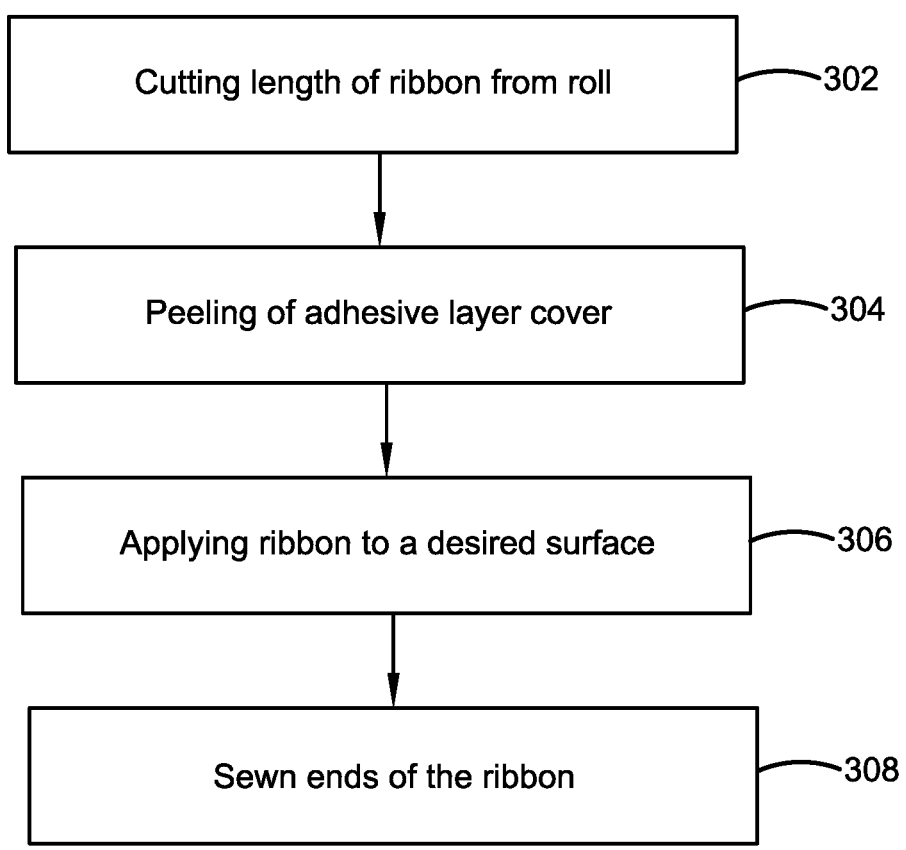
FIG. 3 illustrates a flow diagram depicting a process of using the adhesive ribbon of the present invention for sewing on a fabric without sliding on an object material surface in accordance with the disclosed architecture.

FIG. 3 illustrates a flow diagram depicting a process of using the adhesive ribbon of the present invention for sewing on a fabric without sliding on an object material surface in accordance with the disclosed architecture. Initially, a desired length of the ribbon 104 is cut from the roll 102 using scissors or any other device (Step 302). Then, the adhesive backing cover of the ribbon 104 is peeled off to reveal the adhesive layer of the ribbon (Step 304). Thereafter, the ribbon 104 is applied to a desired surface and is ironed with the adhesive side facing the surface and visually exposing the decorative front surface (Step 306). Accordingly, the ribbon is placed accurately without fear of sliding and shifting. Finally, the ends of the ribbon are sewn to the fabric without requiring the user to stabilize and/or hold the ribbon (Step 308). It should be noted that sewing the ribbon is an optional step and is performed as per preference of a user.

Figure 4:
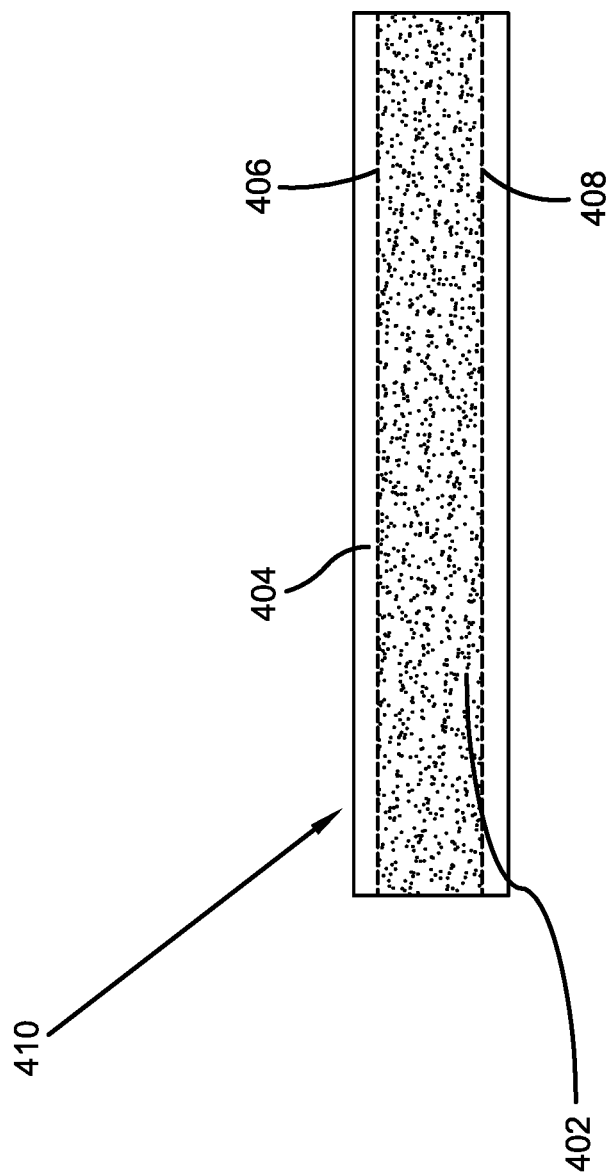
FIG. 4 illustrates a perspective view showing the attachment of the adhesive to the ribbon in accordance with the disclosed architecture.

FIG. 4 illustrates a perspective view showing the attachment of the adhesive to the ribbon in accordance with the disclosed architecture. In the present embodiment, the adhesive layer 402 is sewn to the ribbon fabric 404 along the length of the ribbon. More specifically, the adhesive layer 402 has a top stitching 406 and a bottom stitching 408 for permanently attaching the adhesive layer 402.

The adhesive layer 402 is protected by a backing cover as disclosed in other embodiments of the present invention. Further, the stitching 406,408 is not visible from the front layer 410 of the ribbon and thus, the appearance of the ribbon is not compromised.

Figure 5:
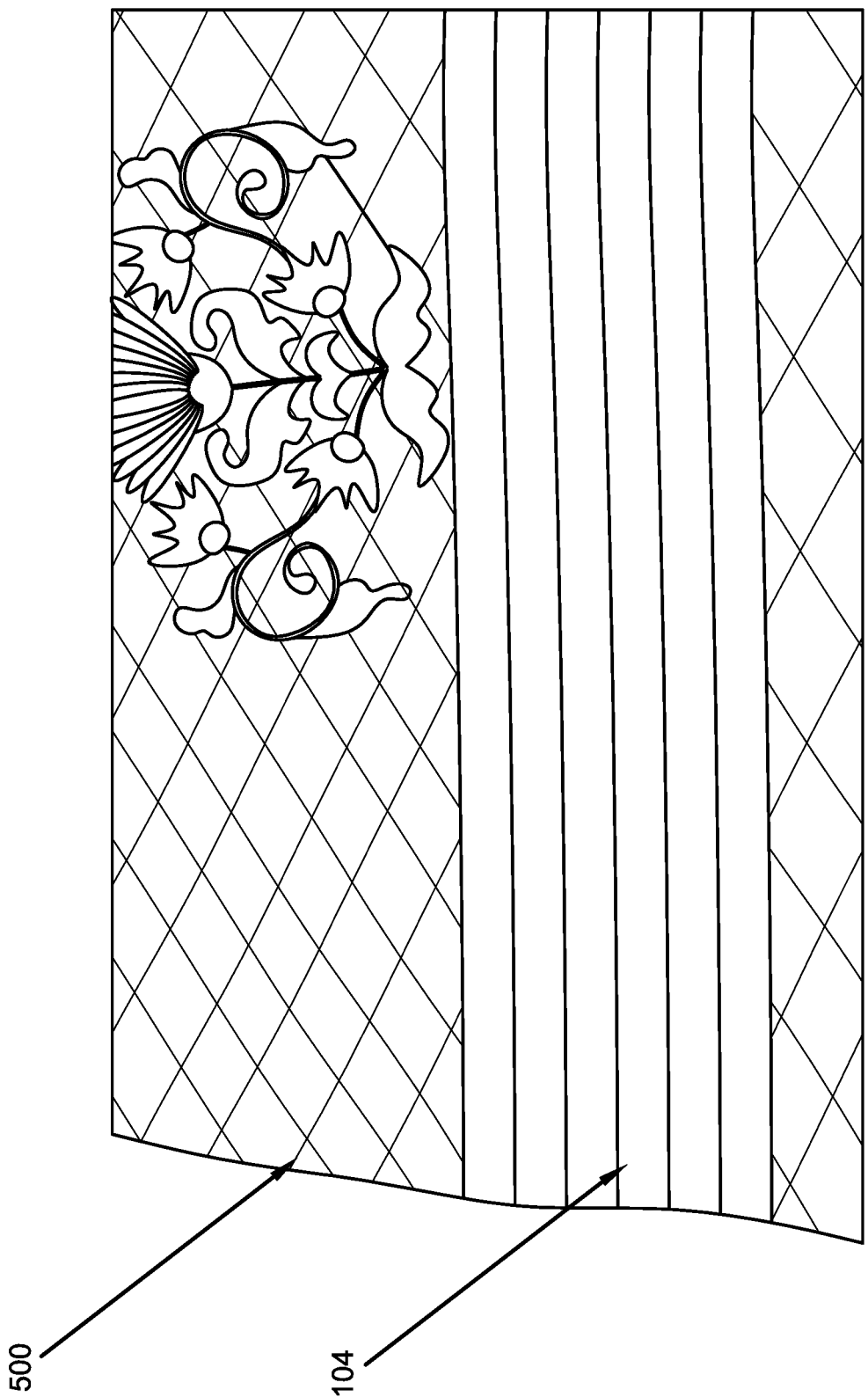
FIG. 5 illustrates a perspective view of a fabric with the silk ribbon of present invention sewn thereon in accordance with the disclosed architecture.

FIG. 5 illustrates a perspective view of a fabric with the silk ribbon of present invention sewn thereon in accordance with the disclosed architecture. The fabric 500 can be of any pillow cover, clothing, quilt, blanket, or more, and can be made of any natural or synthetic fabric. One or more ribbons of the present invention are adhered to the fabric 500 and can be sewn enabling correct and secure placement of the ribbons 104 on the fabric.

The adhesive ribbon of various embodiments of the present invention allows for secure and accurate placement of the ribbon on any object material surface without the use of any glue, pins, and needles. The ribbons are available in various color combinations and can be cut in any desired size for desired application.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "adhesive ribbon", "silk or satin ribbon", "ribbon with integrated adhesive layer", and "ribbon" are interchangeable and refer to the decorative ribbon 104 with integrated adhesive layer 112 of the present invention.

Notwithstanding the foregoing, the decorative ribbon 104 with integrated adhesive layer 112 of the present invention can be of any suitable size and configuration as is known in the art without affecting the overall concept of the invention, provided that it accomplishes the above-stated objectives. One of ordinary skill in the art will appreciate that the decorative ribbon 104 with integrated adhesive layer 112 as shown in the FIGS. are for illustrative purposes only, and that many other sizes and shapes of the decorative ribbon 104 with integrated adhesive layer 112 are well within the scope of the present disclosure. Although the dimensions of the decorative ribbon 104 with integrated adhesive layer 112 are important design parameters for user convenience, the decorative ribbon 104 with integrated adhesive layer 112 can be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An adhesive ribbon for securing to an object material surface, the adhesive flexible ribbon comprising:
    a ribbon in the form of a roll of ribbon wrapped around a spool;
    wherein said ribbon includes a decorative front surface and an adhesive rear surface;
    wherein said adhesive rear surface includes a removable protective covering for protecting said adhesive rear surface;
    wherein said protective covering is selectively removable from said adhesive rear surface after a selected length of said ribbon is pulled from said roll of ribbon;
    wherein said adhesive rear surface is configured to be adhered to the object material surface;
    wherein said object material surface is flexible;
    wherein said decorative front surface and said adhesive rear surface span generally along an entire length of said ribbon; and
    wherein said ribbon is also sewable to said object material surface; and
    wherein the ribbon is a 20 percent synthetic taffeta and 80 percent silk ribbon; and
    wherein the adhesive rear surface is secured to the ribbon via heat, pressure, and stitching.

2. The adhesive ribbon of claim 1, wherein a width of said adhesive rear surface spans generally along an entire width of said ribbon.

3. The adhesive ribbon of claim 1, wherein a width of said adhesive rear surface spans generally from about 70% to about 90% of a width of said ribbon.

4. The adhesive ribbon of claim 3, wherein said front surface comprises an embroidery.

5. The adhesive ribbon of claim 1, wherein said adhesive rear surface comprises a glass cloth tape having a pressure sensitive silicone adhesive.

6. The adhesive ribbon of claim 5, wherein said ribbon is configured to be ironed onto said object material surface.

7. An adhesive ribbon for securing to an object material surface comprising:
    a ribbon in the form of a roll of ribbon wrapped around a spool;
    wherein said ribbon includes a decorative front surface and an adhesive rear surface;
    wherein said adhesive rear surface includes an adhesive layer secured to the adhesive rear surface via heat and pressure and is further attached to said adhesive rear surface via a top stitching along a top edge of said adhesive layer and a bottom stitching along a bottom edge of said adhesive layer;
    wherein said adhesive rear surface includes a removable protective covering for protecting said adhesive rear surface;
    wherein said protective covering selectively removable from said adhesive rear surface after a selected length of said ribbon is pulled from said roll of ribbon;
    wherein said adhesive rear surface in configured to be adhered to the object material surface;
    wherein said object material surface is flexible; and
    wherein said decorative front surface and said adhesive rear surface span generally along an entire length of said ribbon; and
    wherein the ribbon is a 20 percent synthetic taffeta and 80 percent satin ribbon.

8. The adhesive ribbon of claim 7, wherein said ribbon is configured to be sewable to said object material surface.

9. The adhesive ribbon of claim 7, wherein a width of said adhesive rear surface spans generally along an entire width of said ribbon.

10. The adhesive ribbon of claim 7, wherein a width of said adhesive rear surface spans generally from about 70% to about 90% of a width of said ribbon.

11. The adhesive ribbon of claim 10, wherein said front surface comprises an embroidery.

12. The adhesive ribbon of claim 7, wherein said adhesive rear surface includes a glass cloth tape having a pressure sensitive silicone adhesive.

13. The adhesive ribbon of claim 12, wherein said ribbon is configured to be ironed onto said object material surface.

* * * * *